United States Patent [19]
Fachini et al.

[11] Patent Number: 5,191,757
[45] Date of Patent: Mar. 9, 1993

[54] DISCHARGE CONVEYING SYSTEM FOR A COTTON HARVESTER

[75] Inventors: Robert L. Fachini, Naperville, Ill.; Kenneth D. Walser, Hereford, Tex.; John H. Chance; Daniel A. Miller, both of Amarillo, Tex.

[73] Assignee: Case Corporation, Racine, Wis.

[21] Appl. No.: 798,330

[22] Filed: Nov. 18, 1991

[51] Int. Cl.$^5$ .................... A01D 46/08; A01D 46/10
[52] U.S. Cl. ........................ 56/30; 56/13.3; 56/32
[58] Field of Search ................ 56/12.8, 13.3, 28, 30, 56/31, 32, DIG. 8

[56] References Cited

U.S. PATENT DOCUMENTS

| | | | |
|---|---|---|---|
| Re. 27,525 | 11/1972 | Sanderson et al. | 56/30 |
| 2,807,925 | 10/1957 | Andrews | 56/13.3 |
| 3,372,536 | 3/1968 | McCunn | 56/13.3 X |
| 3,512,342 | 5/1970 | Francis et al. | 56/30 |
| 3,530,652 | 9/1970 | Long et al. | 56/12.8 |
| 3,606,009 | 9/1971 | Clendenin et al. | 56/30 X |
| 3,734,563 | 5/1973 | Schlueter | 56/30 X |
| 4,501,112 | 2/1985 | Thedford et al. | 56/30 X |
| 4,635,047 | 1/1987 | Fox et al. | 56/30 |
| 5,024,278 | 6/1991 | Snuknecht | 56/12.8 X |

Primary Examiner—George A. Suchfield
Attorney, Agent, or Firm—Dressler, Goldsmith, Shore, Sutker & Milnamow, Ltd.

[57] ABSTRACT

A discharge conveyor system for a cotton harvester which removes a commingled mixture of ripe and green bolls from cotton plants during a harvesting operation. The discharge conveying system includes duct structure having an inlet arranged proximate to an outlet on a harvesting head assembly from which the commingled mixture of harvested materials pass. An air system directs an air stream through the duct structure such that ripe or lighter bolls are drawn into the duct structure while heavier or green bolls fall from the outlet of the harvesting head assembly. A basket is mounted on the harvester for receiving the green bolls and includes a floor comprised of a plurality of louvers which combine with each other, in one position, to hold green bolls in the basket, and are movable to a second position wherein the louvers are arranged relative to each other for purposes of boll discharge. A conveyor assembly gravitationally receives and conveys green bolls away from the inlet to the duct structure thereby preventing them from interfering with the lighter bolls flowing into the duct structure.

20 Claims, 4 Drawing Sheets

DISCHARGE CONVEYING SYSTEM FOR A COTTON HARVESTER

FIELD OF THE INVENTION

The present invention generally relates to a cotton harvester and, more particularly, to a system arranged to receive and convey green and ripe bolls of cotton contained within a commingled mixture of harvested materials to different areas of the harvester.

BACKGROUND OF THE INVENTION

Cotton harvesters typically include a series of harvesting units arranged on a head assembly for harvesting material from generally parallel rows of cotton plants. In one form of cotton harvester, each harvesting unit includes a pair of brush-type rollers for stripping materials from the plants during the harvesting process.

An inherent feature of cotton strippers is that both ripe and green bolls of cotton are removed from the plants during the harvesting process. The green and ripe bolls are separated through use of an air stream as they pass from the head assembly. The green or heavier bolls are collected in a green-boll container, and the ripe or lighter bolls are blown toward a cotton receiving receptacle.

The green boll container is typically mounted beneath an operator's station of the harvester. As will be appreciated by those skilled in the art, only limited space constraints are provided beneath the operator station. In addition to limited space constraints, sufficient ground clearance for the harvester must be maintained. Thus, the size and therefore capacity of the green boll container is limited. Moreover, the location of the green boll container beneath the operator station makes it difficult for the operator to ascertain the content level of the green boll container. Nonvisual access to the container coupled with limited capacity mandates frequent dumping of the green boll container. Typically, the green boll container is mounted such that it can be tilted to dump the green bolls therefrom at the end of a plant row or whenever the container is full.

In some instances, due to lack of visibility of the container and its limited holding capacity, the green boll container will become full without the knowledge of the operator. When such conditions occur, the accumulation of green bolls within the container interferes with proper separation of green and ripe bolls and, thus, hinders proper operation of the harvester. That is, an accumulation of green bolls can block or plug an inlet to duct structure used to convey the ripe or lighter bolls from the head assembly. Even partial blockage of the inlet to the duct structure can adversely affect the air system used to separate the green and ripe bolls.

Thus, there is a need and a desire for a discharge conveyor system which effectively separates green and ripe bolls and provides structure for positively conveying green bolls away from an inlet to duct structure and for releasably holding the green bolls in a container structured to provide maximum holding capacity while maintaining sufficient ground clearance for the harvester.

SUMMARY OF THE INVENTION

In view of the above, and in accordance with the present invention, there is provided a cotton harvester with a discharge conveying system adapted to direct ripe bolls toward a receptacle and handle green bolls discharged from a harvesting head of the harvester. The discharge conveying system includes an air assisted conveyor including an air system arranged in combination with the duct structure. The duct structure has an inlet arranged to receive materials from the harvesting head assembly. The air system directs an air stream through the duct structure such that ripe or lighter bolls are drawn into the duct structure while heavier or green bolls fall from the outlet of the harvesting head assembly. One aspect of the present invention concerns a conveyor assembly for gravitationally receiving and moving green bolls away from the inlet to the duct structure thereby preventing them from interfering with the lighter bolls flowing into the duct structure. Another aspect of the present invention concerns a container or basket mounted on the harvester for receiving green bolls from the head assembly. The basket includes a floor comprised of a plurality of louvers which combine with each other, in one position, to hold green bolls in the basket and which are movable to a second position for purposes of boll discharge.

The duct structure is carried by the harvester and includes an elongated vertical section extending upwardly from the head assembly toward a receptacle on the harvester. The air system includes a blower mounted on the harvester for generating a stream of air and a nozzle connected to the blower for directing the stream of air upwardly through the duct structure. The nozzle has an outlet arranged downstream of the duct structure inlet. The nozzle directs a primary air stream upwardly through the duct structure to induce a secondary stream of air at the duct structure inlet and thereby separate ripe or lighter bolls from the mixture of materials and into the duct structure.

The conveyor assembly of the present invention gravitationally receives the green bolls or heavier material from the mixture of materials passing from the outlet of the head assembly. In a preferred form of the invention, the conveyor assembly includes an endless conveyor disposed beneath the inlet to the air duct structure and extending in a fore-and-aft direction relative to the harvester. The conveyor assembly includes a surface which receives the heavier materials and is penetrable by stones, rocks, and the like passing from the material outlet of the head assembly. In a most preferred form of the invention, the conveyor comprises a pair of laterally spaced endless drive chains arranged proximate to opposite lateral sides of the head assembly outlet and a plurality of fore-and-aft spaced rods connected at opposite ends to and driven by the chains to define a movable conveyor surface which allows dirt, stones, and other trash to pass therethrough.

In the illustrated embodiment, the basket for containing the green bolls received from the outlet of the head assembly mounts the conveyor. The basket extends in a fore-and-aft direction on the harvester and includes a pair of laterally spaced side walls arranged on opposite sides of the inlet to the duct structure with the bottom or floor arranged beneath the inlet to the duct structure. The rear end of the bottom is disposed closer to the ground than is the forward end to promote gravitational movement of the heavier materials away from the inlet to the duct structure.

The louvers comprising the floor of the basket are interconnected to each other. Moreover, each louver pivots about an axis extending substantially coaxial with the longitudinal axis thereof to minimize the clearance required between the basket floor and the ground over which the harvester moves. The floor terminates short of a foremost end of the basket to define an opening. The opening in the floor of the basket allows the stones, rocks, and trash passing through the conveyor to fall to the ground as the harvester moves across the field.

A first hydraulic motor is connected to and drives the conveyor while the pivotal position of the louvers and, thereby, the holding capacity of the basket is influenced by a second hydraulic motor. Hydraulic circuitry controls operation of the hydraulic motors. In the preferred embodiment, the hydraulic circuitry includes a pressurized fluid source and a suitable valve mechanism connected between the fluid source and each of the hydraulic motors for selectively controlling which hydraulic motor is enabled during operation of the harvester.

The conveyor assembly of the present invention gravitationally receives the green bolls and heavier material from the outlet end of the head assembly and positively conveys such materials away from the inlet to the duct structure to inhibit such material from interfering with or blocking the flow of lighter material into the duct structure. Moreover, continuously driving the conveyor means during the harvesting operation maintains the inlet to the duct structure free of an accumulation of material while allowing stones, rocks, and the like to pass through the conveyor to the ground. Unlike other green boll containers, the basket of the present invention does not require tilting to dump the green bolls therefrom. By allowing the floor louvers to pivot about their longitudinal axes provides for maximization of the limited space constraints wherein the basket is mounted.

Numerous other features and advantages of the present invention will become readily apparent from the following detailed description, the accompanying drawings, and the appended claims.

DETAILED DESCRIPTION OF THE PRESENT INVENTION

Figure 1:
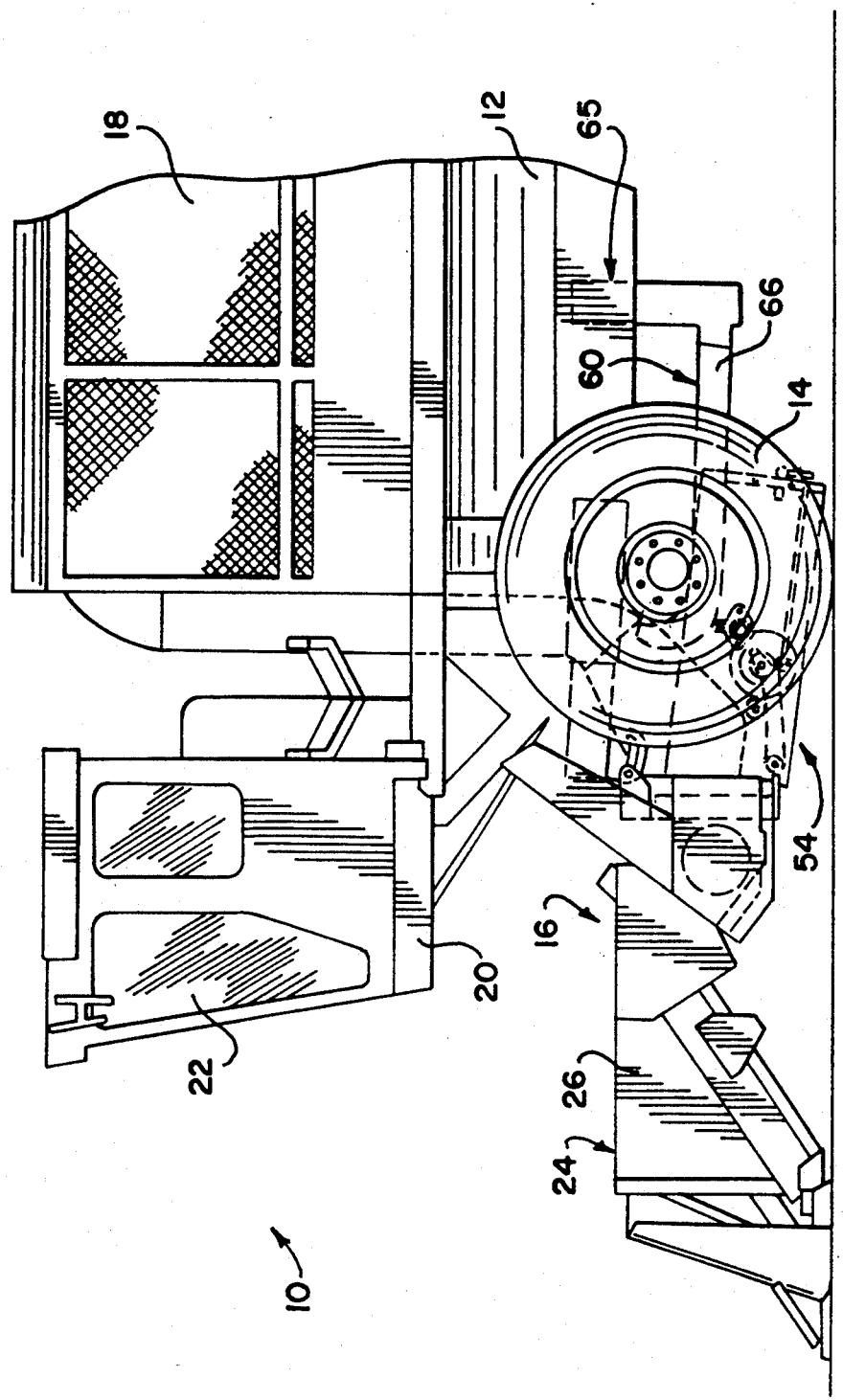
FIG. 1 is a partial side elevational view of a cotton harvester embodying features of the present invention.

While the present invention is susceptible of embodiment in various forms, there is shown in the drawings a presently preferred embodiment hereinafter described with the understanding that the present disclosure is to be considered as an exemplification of the invention and is not intended to limit the invention to the specific embodiment illustrated.

Referring now to the drawings, wherein like reference numerals indicate like parts throughout the several views, in FIG. 1 there is schematically illustrated a cotton harvester 10 including a fore-and-aft extending mobile chassis or frame 12 supported for movement across a field of cotton plants by front and rear pairs of wheels 14, with only one wheel being illustrated for purposes of this description. A harvesting head assembly 16 is mounted on the chassis 12 for harvesting cotton materials in a commingled mixture of ripe and green bolls from generally parallel rows of cotton plants as the harvester is driven across the field. In the illustrated embodiment, a relatively large receptacle 18 is mounted on the chassis 12. The receptacle 18 is positioned to receive ripe cotton bolls from the head assembly 16. Forward of the receptacle 18 is an operator's platform 20 that includes a cab region 22 from where the cotton harvester is operated.

The harvesting head assembly 16 laterally extends across and is supported on the chassis 12 of the harvester for generally vertical movement. A plurality of harvesting units 24 are carried by the head assembly 16 preferably in side-by-side relation for harvesting materials including ripe and green bolls as the harvester is driven across the field. As many as six harvesting units may be laterally arranged across the harvester to receive a like number of rows of cotton plants.

Each harvesting unit 24 is a conventional brush-roll type which is adapted to strip materials from the cotton plants as the harvester is driven through the field. Each harvesting unit 24 includes a fore-and-aft housing 26 defining a central passage which allows the cotton plants to pass therethrough. As fragmentarily shown in FIG. 2, head assembly 16 includes a laterally elongated frame 28 comprised of a plurality of interconnected tubular members arranged in a laterally elongated generally J-shaped cross-sectional configuration. A lift assembly 30 connects the frame 28 and thereby the head assembly 16 to the chassis of the harvester for generally vertical movement while maintaining the harvesting units generally parallel to the ground surface.

Harvesting head assembly 16 further includes a rotatably driven auger 36 laterally extending through an open trough area 38 defined by frame 28. Conventional panel structure 40 is suitably attached to the frame 28 to enclose the trough area 38. As is conventional, auger 36 includes left and right-hand spiral sections for advancing harvested materials received from the harvesting units toward a discharge area or outlet, generally designated by reference numeral 42 whereat the harvested materials are passed or discharged from the head assembly 16. The discharge outlet 42 is normally arranged near the longitudinal center of the harvester.

According to the present invention, a discharge conveying system 50 is positioned rearwardly of the head assembly and directly in line with the discharge outlet 42. The discharge conveying system 50 includes an air-assisted conveyor 52 for directing ripe bolls or lighter materials toward the receptacle 18 (FIG. 1), a basket 54 for collecting green or heavier materials passing from the outlet 42 of the head assembly 16, and a conveyor assembly 56 for rearwardly moving green bolls and heavier materials away from the outlet 42 of the head assembly to inhibit an accumulation of materials in a manner interfering with the lighter or ripe bolls flowing toward and into the conveyor means 52.

The air-assisted conveyor 52 includes duct structure 58 arranged in combination with an air system 60 for drawing ripe bolls from the mixture of harvested materials passing from the head assembly 16 and moving such lighter materials toward the receptacle 18 (FIG.

1). As shown, duct structure 58 is arranged on the harvester to vertically project away from the head assembly 16. At its lower end, duct structure 58 defines a material inlet 62 which is arranged adjacent to the head assembly discharge outlet 42 from whence harvested materials pass.

As shown in FIG. 1 the air system 60 includes a conventional blower 65 mounted on the harvester for generating a stream of air which is directed toward the head assembly 16 by a suitable conduit 66. In the illustrated embodiment, conduit 66 is supported along its length from a horizontal section 57 of chassis 12. Conduit 66 extends generally horizontally and forwardly toward the head assembly and is located in general fore-and-aft alignment with the discharge outlet 42 on the head assembly. Conduit 66 terminates in a vertical nozzle 68 which directs a primary stream of air axially upward through the duct structure 58 to induce a secondary stream of air at the material inlet 62 of the duct structure 58 for drawing ripe bolls from the mixture and influencing movement of lighter materials into the duct structure.

The induced air flow at the inlet 62 causes the ripe cotton bolls to rise through the duct structure 58 and permits the green bolls and heavier material to separate and gravitate into the basket 54. Basket 54 opens to a forward end of the harvester and is positioned beneath the inlet opening 62 to the duct structure 58 to receive and releasably hold green bolls. Basket 54 is attached at its forward end to the frame 28 of the head assembly, and its rear end is suitably attached to the horizontal section 57 of chassis 12 (FIG. 4) so as to allow the rear end of the basket 54 to be vertically adjusted. Notably, the rear end of basket 54 is normally lower (closer to the ground) than is the forward end of the basket. Thus, green bolls and heavier material tend to gravitate toward a rear end of the basket.

Figure 4:
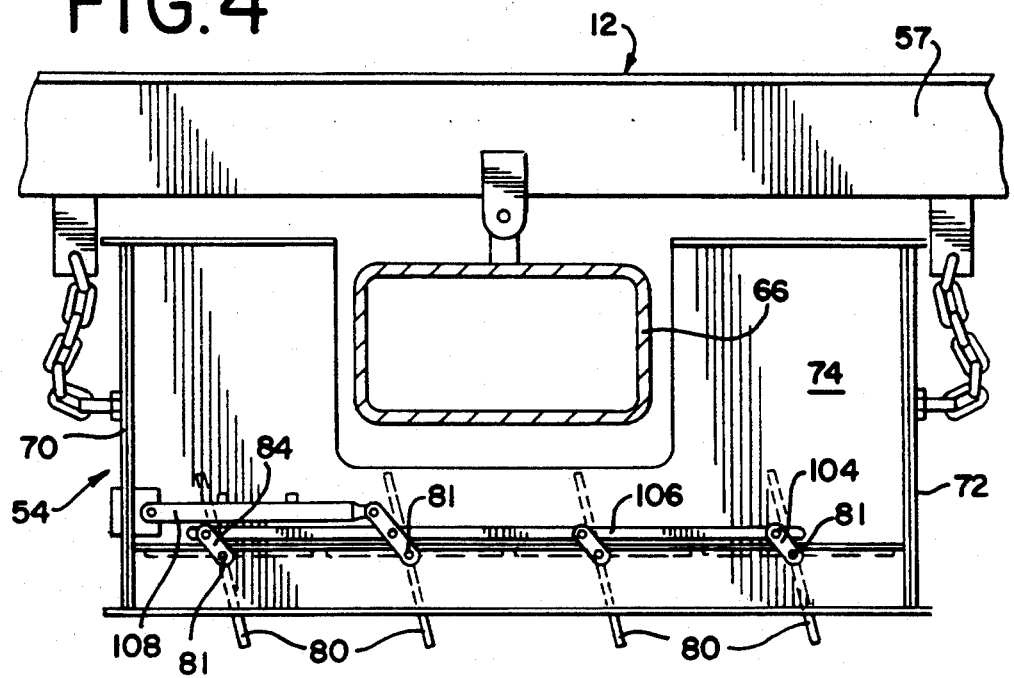
FIG. 4 is a rear elevational view of some of the component parts of the present invention.

Basket 54 includes laterally spaced upright side panels 70 and 72 which extend rearwardly from and flank opposite sides of the discharge outlet 42 on the head assembly. The upright panels are suitably joined to each other to add strength and rigidity to the basket 54. As shown in FIG. 4, a rear panel or wall 74 closes the aft end of basket 54.

Figure 2:
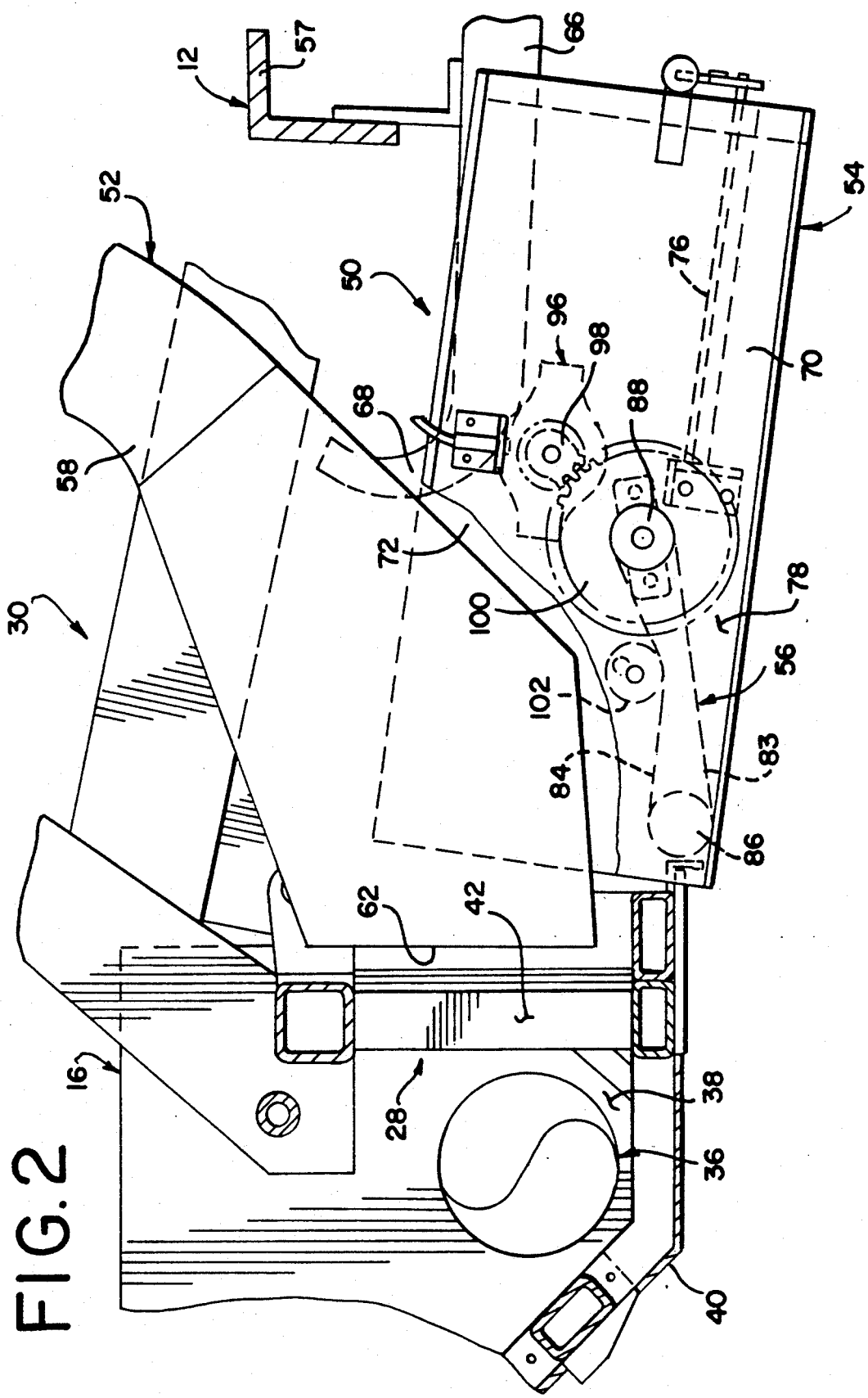
FIG. 2 is an enlarged side sectional view illustrating component parts of a discharge conveying system according to the present invention arranged at a rear end of a head assembly of a cotton harvester.
Figure 3:
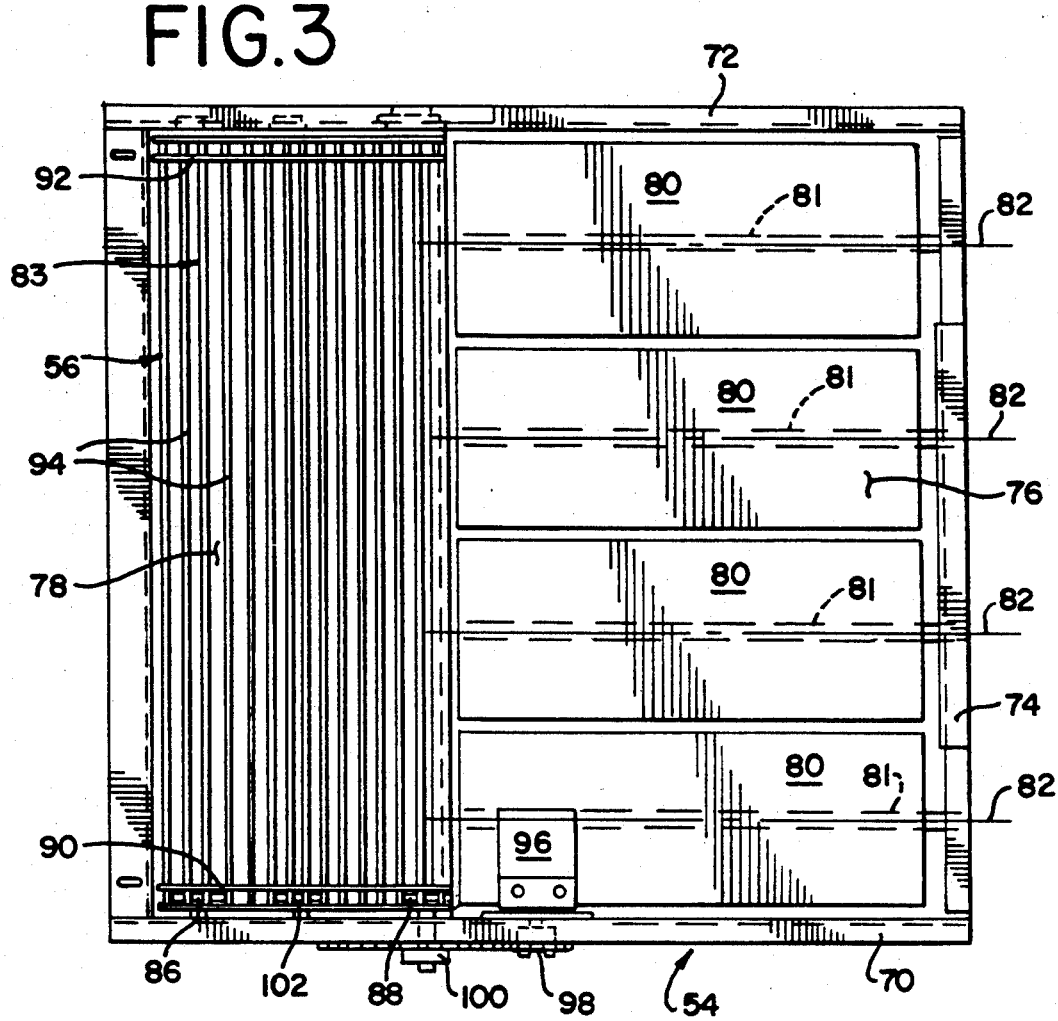
FIG. 3 is a top plan view of component parts of the present invention.

As shown in FIGS. 2 and 3, a closure or floor 76 is provided at the bottom or base of basket 54. In a preferred form, floor 76 extends forwardly from the rear wall 74 and terminates short of a foremost end of the basket to define an opening 78 at a forward end thereby allowing stones, rocks, and the like passing from the head assembly to gravitate to the ground over which the harvester moves.

As shown in FIG. 3, floor 76 is comprised of a series of adjacent louvers or slats 80. Each louver 80 is supported for pivotal movement by a pivot rod 81 and is movable between first and second positions. In their first position (shown in solid lines in FIG. 3), the louvers 80 combine with each other to hold green bolls in the basket 54. In their second position (shown in dotted lines in FIG. 4), the louvers 80 are arranged relative to each other for purposes of boll discharge. The pivot rod 81 for each louver 80 defines a pivot axis 82 about which the louver moves and which is substantially coaxial with the longitudinal axis of the louver.

In a preferred form of the invention, conveyor assembly 56 is supported by the basket 54 beneath the inlet 62 to the duct structure 58. The conveyor assembly 56 includes an endless conveyor 83 defining a support surface 84 extending in a fore-and-aft direction above the opening 78 defined at a forward end of basket 54. As shown in FIG. 2, conveyor 83 is entrained about fore-and-aft spaced rotational members 86 and 88.

Figure 5:
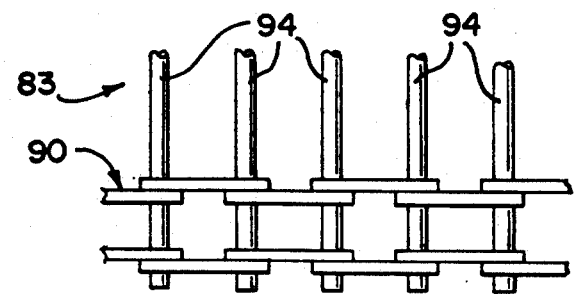
FIG. 5 is an enlarged fragmentary view of one section of a conveyor mechanism associated with the present invention.

In a most preferred form of the invention, and as illustrated in FIG. 3, conveyor 83 is comprised of a pair of laterally spaced endless chains 90, 92 which drive a series of fore-and-aft spaced laterally extending rods 94. The driving chains 90, 92 are arranged proximate to opposite lateral sides of the outlet of the head assembly and are entrained about the rotatable members 86 and 88. As shown in FIG. 5, a free end of each rod 94 is suitably connected to the chain links of the driving chains. By such an arrangement, the support surface 84 of conveyor 83 is penetrable by stones, rocks, and the like passing from the material outlet of the head assembly 16.

As shown in FIG. 2 and 3, conveyor 83 is driven by a motor 96 preferably mounted on the side wall 70 of basket 54. A drive gear 98 is connected to the output shaft of the motor 96 and preferably intermeshes with a driven gear 100. Gear 100 is connected to and adapted to drive the rotatable member 88 and thereby provide motive power to the conveyor 83. In a most preferred form of the invention, motor 96 is a hydraulically driven motor. Moreover, and as shown in FIG. 2, an idler member 102, carried by wall 70 of basket 54, is provided to maintain proper tension on the conveyor 83.

Turning again to FIG. 4, the pivot rod 81 of each louver 80 is provided with a crank arm 104 at the rear end thereof beyond the rear wall 74 of basket 54. The crank arms 104 are interconnected with each other by an elongated bar 106. By this arrangement, back and forth movement of the adjusting bar 106 can shift the louvers 80 to any position between fully closed and fully opened positions. In a preferred form of the invention, a hydraulic motor 108 is provided for shifting the bar 106. In a most preferred form of the invention, motor 108 is a spring return hydraulic cylinder having one end connected to the basket 54 and an opposite end connected to one end of a crank arm 104.

Figure 6:
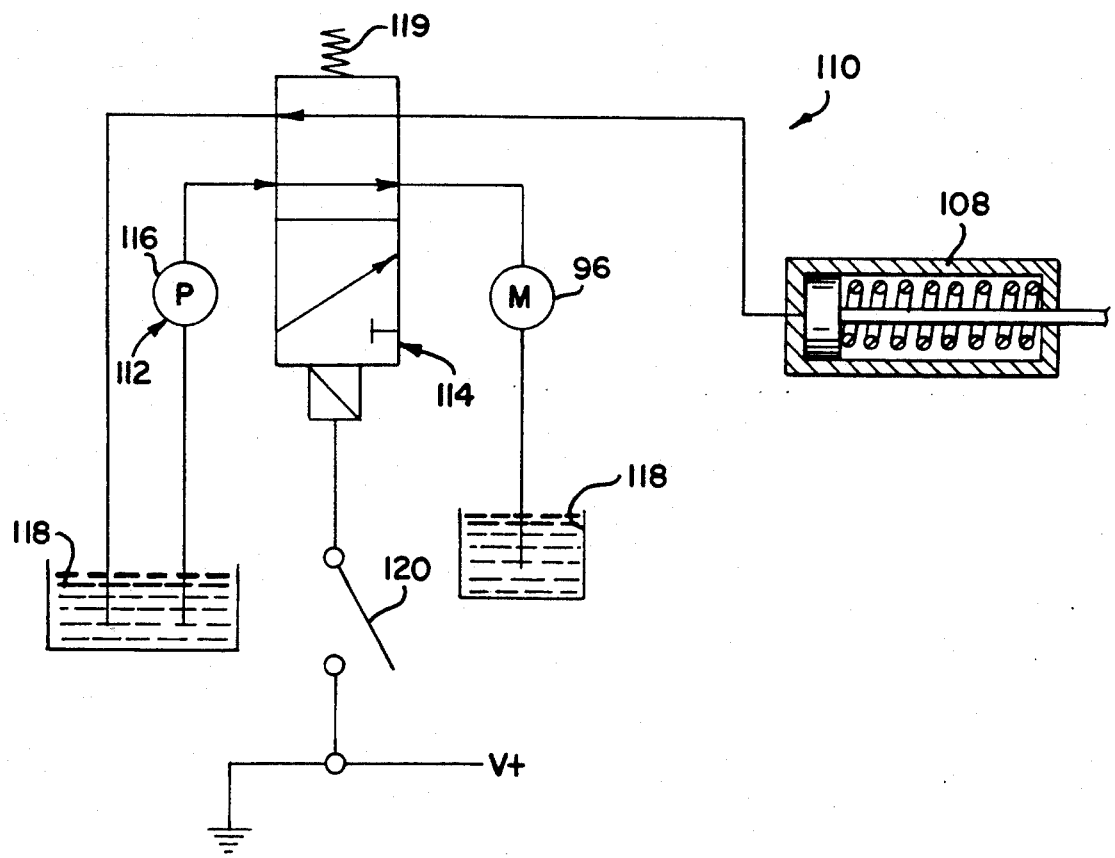
FIG. 6 is a schematic illustration of circuitry for selectively operating the discharge conveying system of the present invention.

As shown in FIG. 6, the discharge conveying system of the present invention further includes hydraulic circuitry 110 for controlling operation of the hydraulic motors 96 and 108. The hydraulic circuitry 110 includes a source of pressurized fluid 112 located on the harvester and selectively connected through a two-position operator controlled valve 114 for selectively providing fluid under pressure to either motor 96 or 108. The pressurized source of fluid 112 preferably includes a pump 116 mounted on and driven by the harvester. Pump 116 operates in a conventional manner in that it withdraws fluid from a reservoir 118 on the harvester and provides a pressurized fluid output flow therefrom. The operator controlled valve 114 has a first position, shown in FIG. 6, wherein the output of pump 116 is directed toward motor 96 and allows hydraulic motor 108 to be connected to exhaust. Valve 114 has a second position wherein the output of pump 116 is directed to the hydraulic motor 108. As will be appreciated, provision of pressurized hydraulic fluid to motor 108 causes linear distension of the motor thereby moving the crank arms 104 and adjusting the position of the louvers 80.

In the illustrated embodiment, valve 114 includes a biasing element 119 which normally maintains valve 114 in the first position, that is, to enable motor 96 and connect motor 108 to exhaust. The position of valve 114 is influenced by a normally open contact switch 120 located in the cab region of the combine. The switch 120 is connected to a suitable source of power, such as the battery on the combine. When the operator changes the state of switch 120, valve 114 shifts to a second position to enable operation of motor 108 and disable operation of motor 96.

During operation, the harvesting units 24 of head assembly 16 strip materials including a commingled mixture of ripe and green bolls from the cotton plants as the harvester is driven across the field. The auger 36 receives these materials from the harvesting units and passes them to the rearwardly opening discharge outlet 42 from whence they pass.

The material inlet 62 of the duct structure 58, forming part of the discharge conveying system 50, is positioned proximate to the outlet 42 of the head assembly. Nozzle 68 directs a primary stream of air upwardly and axially through the duct structure. The differential pressure between the primary stream of air and the surrounding air induces a secondary stream of air which separates and guides the ripe bolls into the inlet 62. The ripe bolls subsequently enter the main stream of air and are driven through the duct structure 58 under the influence of the primary air stream toward the receptacle 18.

The green bolls and heavier material fall toward the forwardly opening basket 54 which is positioned beneath the opening 62 to the duct structure. Basket 54 has its front end connected to frame 28 of the head assembly and has its rear end supported from the frame 12 of the harvester such that it is arranged closer to the ground and such that the heavier materials gravitate toward the rear end of the basket 54. Notably, the floor opening 78 at the forward end of the basket allows stones, rocks, and the like to fall to the ground.

To promote the flow of material into basket 54, the side panels 70 and 72 of basket 54 flank the discharge opening 42 on the head assembly 16. The basket 54 may be readily emptied by moving the louvers 80 under the influence of motor 108 which simultaneously pivots the louvers about their axes 82. Because the louvers pivot about an axis 82 extending substantially co-axial with the longitudinal axis thereof, when the louvered slat is rotated to unload, there is but minimal extension of the louvers 80 beneath the floor of the basket. This prevents inadvertent damage to the basket if the louvers 80 are left open while the harvester is operated.

To promote efficient operation of the discharge conveying system of the present invention, conveyor assembly 56 is provided to positively remove green bolls and the like from the area of the duct structure inlet opening 62. Positively removing the green bolls promotes passage of the ripe bolls into the duct structure 58 by preventing an accumulation of materials at the inlet opening 62 which would hinder the passage of the ripe bolls into the duct structure. The supporting and receiving surface 84 of the conveyor 83 is preferably penetrable to allow stones, rocks, and the like to pass therethrough and fall to the ground through opening 78 in basket 54.

Conveyor 83 is driven under the influence of a motor 96. Normally, the conveyor 83 is driven during operation of the harvester. To facilitate operation, however, switch 120 in the cab region 22 of the harvester can be switched to influence a valve 114 to disable motor 96 and to enable motor 108 in a manner discharging the bolls from the basket 54.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A discharge conveying system for a cotton harvester having a fore-and-aft extending chassis with a harvesting head assembly carried by said chassis, said harvesting head assembly including harvesting means for removing cotton materials in a commingled mixture of ripe and green bolls from cotton plants during a harvesting operation and defining an outlet for passing said ripe and green bolls from said head assembly, said discharge conveying system comprising:

duct structure arranged on the harvester to project away from the harvesting head assembly and having an inlet disposed proximate to the outlet of said harvesting head assembly;

an air system arranged on the harvester for directing an air stream through said duct structure to induce a stream of air at the inlet to the duct structure for drawing ripe bolls from the mixture and moving them into the duct structure; and conveyor means for gravitationally receiving ripe bolls from the mixture passing from the outlet of the head assembly, said conveyor means including an endless conveyor defining a generally horizontal supporting surface disposed beneath the inlet to the duct structure for directing the green bolls horizontally away from the inlet to promote drawing the ripe bolls through the inlet into the duct structure.

2. The discharge conveying system according to claim 1 further including a basket supported on said chassis for receiving green bolls from said conveyor means.

3. The discharge conveying system according to claim 2 wherein said conveyor is carried by said basket.

4. A discharge conveying system for a cotton harvester including a harvesting head assembly which removes cotton materials from plants in a commingled mixture of ripe and green bolls and defines an outlet through which the ripe and green bolls pass, said discharge conveying system comprising:

conveyor means for directing ripe bolls toward a cotton receiving receptacle, said conveyor means including duct structure extending away from said head assembly and defining an inlet arranged adjacent to the outlet of said head assembly, and means for directing a stream of air through the duct structure such that ripe bolls are drawn from the mixture and through the inlet to said duct structure; and means for collecting green bolls received from the outlet of said head assembly, said collecting means including a basket having a floor disposed beneath the inlet to said duct structure, said basket floor comprising a plurality of louvers, each louver being rotatable about an axis between a first position wherein the louvers combine with each other to hold green bolls in said basket and a second position wherein the louvers are arranged relative to each other for purposes of boll discharge.

5. The discharge conveying system according to claim 4 wherein said means for directing a stream of air through the duct structure comprises a blower mounted on said harvester for generating said stream of air and a nozzle connected to said blower for directing said stream of air axially upward in the duct structure.

6. The discharge conveying system according to claim 4 wherein the pivot axis for each louver is substantially coaxial with the longitudinal axis thereof to minimize the clearance required between the basket floor and the ground over which the harvester moves.

7. The discharge conveying system according to claim 4 wherein said louvers are interconnected to each other and are moved under the influence of hydraulic motor means.

8. A discharge conveying system for a cotton harvester having a material outlet through which harvested materials pass, said discharge conveying system comprising:
   duct structure having a material inlet arranged adjacent said cotton harvester outlet;
   an air system for directing an air stream through said duct structure such that lighter materials passing from the material outlet are drawn into the duct structure; and
   conveyor means arranged beneath the duct structure for gravitationally receiving heavier materials passing from said outlet, said conveyor means including a conveyor defining a fore-and-aft extending and movable surface for conveying said heavier materials away from the inlet to said duct structure to facilitate the flow of lighter materials into said duct structure, said conveyor surface being penetrable by stones, rocks and the like passing from the material outlet of said cotton harvester.

9. The discharge conveying assembly according to claim 8 furhter including a basket carried by said harvester for mounting said conveyor means relative to said duct structure and for receiving and holding heavier materials.

10. A discharge conveying system for a cotton harvester having a material outlet through which harvested materials pass, said discharge conveying system comprising:
   duct structure having a material inlet arranged adjacent said cotton harvester outlet;
   an air system for directing an air stream through said duct structure such that lighter materials passing from the material outlet are drawing into the duct structure, wherein said air system includes means for generating an air stream, and conduit means opening to said duct structure downstream of said material inlet for inducing an upwardly directed secondary stream of air at the material inlet effective to draw lighter materials into the duct structure; and
   conveyor means arranged beneath the duct structure for gravitationally receiving heavier materials passing from said outlet and conveying said heavier materials away from the inlet to said duct structure to facilitate the flow of lighter materials into said duct structure.

11. A discharge conveying system for a cotton harvester having a material outlet through which harvested materials pass, said discharge conveying system comprising:
   duct structure having a material inlet arranged adjacent said cotton harvester outlet;
   an air system for directing an air stream through said duct structure such that lighter materials passing from the material outlet are drawing into the duct structure;
   conveyor means arranged beneath the duct structure for gravitationally receiving heavier materials passing from said outlet and conveying said heavier materials away from the inlet to said duct structure to facilitate the flow of lighter materials into said duct structure; and
   a basket carried by said harvester for mounting said conveyor means relative to said duct structure and for receiving and holding heavier materials, and wherein said basket extends in a fore-and-aft direction relative to said harvester and includes a bottom which extends forwardly from a rearmost end of said basket and terminates short of a foremost end of said basket to define an opening at a forward end thereby allowing stones, rocks, and the like to gravitate to the ground.

12. A discharge conveying assembly for a cotton harvester including a harvesting head assembly which removes cotton materials from plants in a commingled mixture of ripe and green bolls and defines an outlet from which the ripe and green bolls are exhausted, said discharge conveying assembly comprising:
   first conveyor means for directing ripe bolls toward a cotton receiving receptacle, said first conveyor means including duct structure extending away from said head assembly and defining an inlet arranged adjacent to the outlet of said head assembly, and means for directing a stream of air through the duct structure such that ripe bolls are drawn from the mixture and through the inlet to said duct structure, wherein said duct structure includes an elongated vertical section extending upwardly from the head assembly and to said receptacle, and said means for directing a stream of air comprises a blower mounted on the harvester for generating a stream of air and conduit structure leading from said blower to and into a lower end of said vertical section to direct a stream of air; and
   second conveyor means for receiving green bolls from the outlet of the head assembly and directing the green bolls away from the duct structure inlet to inhibit an accumulation of green bolls at the inlet to the duct structure, wherein said second conveyor means comprises a pair of laterally spaced endless drive chains arranged proximate to opposite lateral sides of said outlet, and a plurality of fore-and-aft spaced rods connected at opposite ends to and driven by said chains to define a movable conveyor surface which allows dirt, stones, and other trash to pass therethrough.

13. The discharge conveying assembly according to claim 12 further including a basket for releasably holding green bolls advanced thereto by said conveyor means.

14. A discharge conveying system for a cotton harvester having a material outlet, said discharge conveying system comprising:
   duct structure carried by the harvester, and having an inlet arranged adjacent said cotton material harvester outlet;
   an air system for directing an air stream through said duct structure whereby the lighter material passing from said outlet is lifted into said duct structure; and a basket mounted on said harvester and disposed beneath said outlet for gravitationally receiving heavier material passing from said outlet, said basket including conveyor means for moving heavier materials away form the material inlet to said duct structure, and a bottom comprised of a series of adjacent louvers which are pivotally movable with respect to each other.

15. The discharge conveying system according to claim 14 wherein said conveyor means includes an endless conveyor having a supporting surface passing beneath said material outlet for receiving heavier materials passing from said material outlet.

16. The discharge conveying system according to claim 14 wherein the basket is mounted such that a rear end of said floor is disposed closer to the ground than is the forward end of said bottom.

17. The discharge conveying system according to claim 14 wherein the floor of said basket extends in a fore-and-aft direction relative to said harvester and extends forwardly from a rearmost end of said basket and terminates short of a foremost end of said basket to define an opening, and wherein the conveyor means includes a conveyor having a fore-and-aft extending surface overlying said opening defined by said basket for gravitationally receiving heavier materials and which is penetrable by stones and the like which fall through said opening and to the ground.

18. The discharge conveying system according to claim 14 wherein said louvers are interconnected to each other and wherein each louver pivots about an axis between open and closed positions.

19. The discharge conveying system according to claim 18 wherein said conveyor means is operated under the influence of a first hydraulic motor and wherein the pivotal position of said louvers is influenced by a second hydraulic motor.

20. The discharge conveying system according to claim 19 further including hydraulic circuitry means for controlling operation of said hydraulic motors, said hydraulic circuitry means including a pressurized fluid source and selectively operated valve means connected between said fluid source and each hydraulic motor for influencing which motor is enabled.

* * * * *

UNITED STATES PATENT AND TRADEMARK OFFICE
CERTIFICATE OF CORRECTION

PATENT NO. : 5,191,757

DATED : March 9, 1993

INVENTOR(S) : R.L. Fachini; K.D. Walser; J.H. Chance; D.A. Miller.

It is certified that error appears in the above-identified patent and that said Letters Patent is hereby corrected as shown below:

Column 9, Claim 9, line 1, "assembly" should be --system--;

Column 10, Claim 11, line 3, "drawing" should be --drawn--.

Signed and Sealed this

Twenty-first Day of December, 1993

Attest:

BRUCE LEHMAN

*Attesting Officer*  Commissioner of Patents and Trademarks